United States Patent [19]

Koop

[11] 4,376,611
[45] Mar. 15, 1983

[54] CAR TOP CARRIER FOR WHEELCHAIR

[76] Inventor: Bruce H. Koop, 3326 Edgewood North, Crystal, Minn. 55427

[21] Appl. No.: 270,347

[22] Filed: Jun. 4, 1981

[51] Int. Cl.³ .............................................. B60R 9/04
[52] U.S. Cl. ................................. 414/462; 224/310; 224/328; 294/67 AB; 294/67 B; 414/559; 414/921
[58] Field of Search ............. 414/462, 498, 522, 538, 414/559, 608, 921; 294/67 R, 67 AB, 67 B, 67 BC, 67 D; 224/42.03 B, 42.08, 42.44, 310, 328

[56] References Cited

U.S. PATENT DOCUMENTS

| | | | |
|---|---|---|---|
| 2,784,923 | 3/1957 | Sepke | 294/67 BC |
| 3,115,978 | 12/1963 | Anderson et al. | 414/462 |
| 3,572,802 | 3/1971 | Zupancic | 294/67 R |
| 3,823,839 | 7/1974 | Petzing et al. | 414/462 |
| 3,878,955 | 4/1975 | Udden | 414/462 |
| 4,039,096 | 8/1977 | McAllister | 414/462 |
| 4,134,509 | 1/1979 | Clement | 414/462 |
| 4,236,860 | 12/1980 | Gottlieb et al. | 414/462 |
| 4,242,030 | 12/1980 | Clement | 414/462 |

FOREIGN PATENT DOCUMENTS

| | | | |
|---|---|---|---|
| 30776 | 10/1955 | Fed. Rep. of Germany | 294/67 AB |
| 1441036 | 4/1966 | France | 414/462 |

*Primary Examiner*—Leslie J. Paperner
*Attorney, Agent, or Firm*—Kinney, Lange, Braddock, Westman & Fairbairn

[57] ABSTRACT

A car top wheelchair carrier includes a carrier case mounted on the top of a car and open to one side of the car. A moving platform inside of the case is movable between a loaded position entirely within the case and an unloading position where an outer edge portion of it is downwardly hinged at an acute angle to overhang the side of the car. A wheelchair cage is provided for encompassing a folded wheelchair to be stored, and the cage includes a rectangular angle iron back frame member. A top edge of this back frame member is connected by a pair of cables to a pair of winches mounted with respect to the moving platform. The wheelchair cage, whether it encompasses and retains a wheelchair or not, is lifted up onto the platform by the winch means and the platform is then moved to its retracted position inside of the case. A door, hinged to the carrier case roof can be opened to let the wheelchair cage and wheelchair be raised and lowered into the carrier and can be closed when the wheelchair cage is stored or stowed.

11 Claims, 8 Drawing Figures

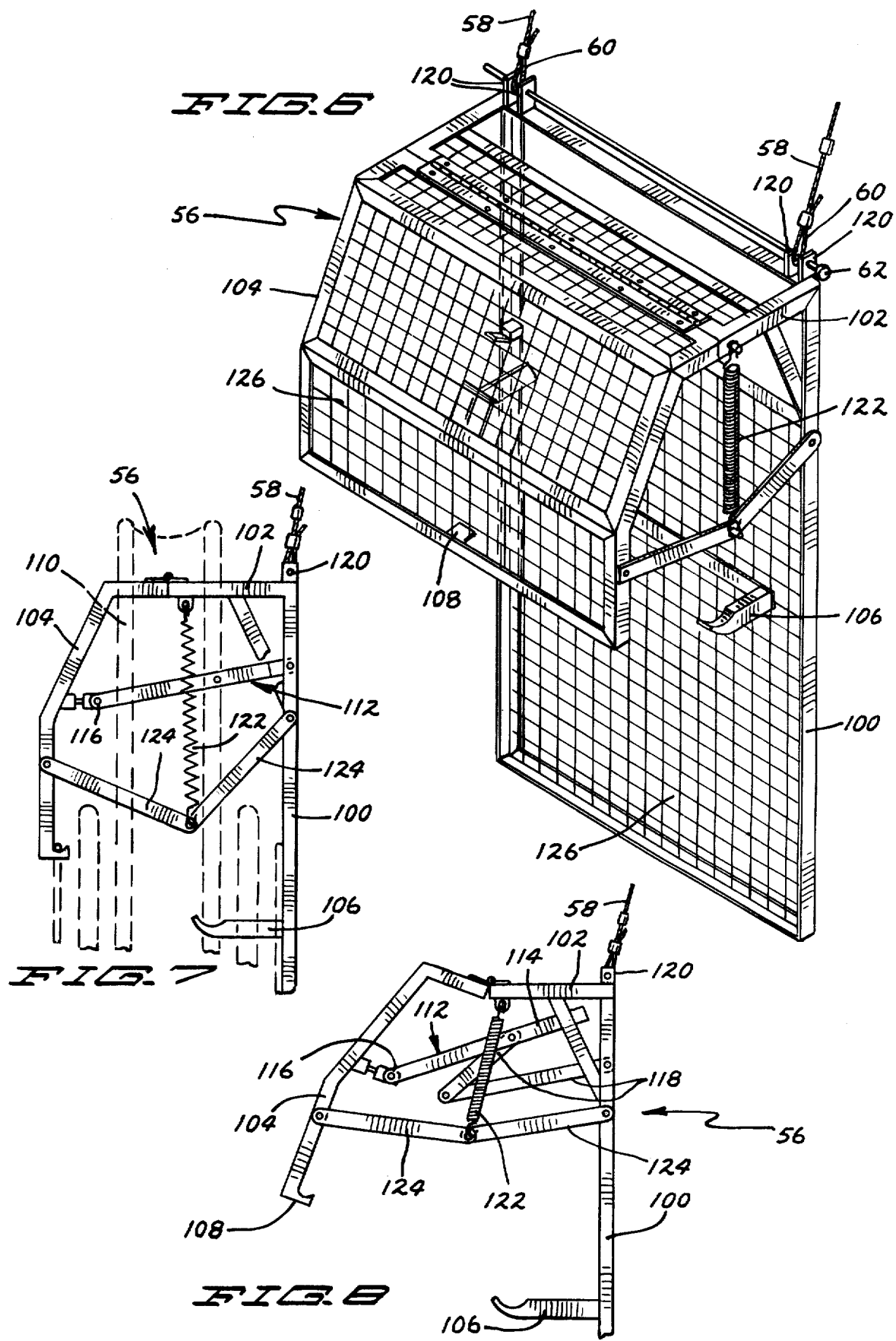

CAR TOP CARRIER FOR WHEELCHAIR

BACKGROUND OF THE INVENTION

1. Field of the Invention

This invention has relation to the storing of a wheelchair on top of a car and the raising and lowering of the wheelchair to and from the car top in such a manner that a person who needs the wheelchair to enter and leave the car can accomplish such raising and lowering and storage without the aid of others.

2. Description of Prior Art

A number of schemes and structures have been devised to accomplish the purpose of the invention as set out above. See U.S. Pat No. 4,134,509 granted to Clement in January of 1979; U.S. Pat. No. 4,039,096 granted to McAllister in August of 1977; and U.S. Pat. No. 3,878,955 granted to Udden in April of 1975.

In the Clement and McAllister patents, a winch fixedly mounted to the floor of a car top carrier case is used together with a cable to draw a wheelchair up from spaced relation to the side of a car, over the leading edge of the carrier case, and into a stored position inside of the case. In the case of the McAllister patent, a U-shaped auxiliary lifting frame member is pivotably mounted to a rectangular movable frame extension. When the wheelchair comes up into contact with this auxiliary lifting frame member, it pivots back to a substantially horizontal position to attempt to lift the wheelchair over the outer rectangular movable frame extension. The cable then continues to pull to draw the wheelchair into the case.

In the case of the McAllister patent, the lifting of the wheelchair from vertical position on the ground to horizontal position aligned with the carrier case is accomplished by the use of linear hydraulic piston/cylinder motors. Once this is accomplished, the winch and cable are used to pull the wheelchair into the case.

In the case of the Udden patent, the entire case comes off of the top of a car, pivoting on a horizontal axis set at about the lower level of the passenger window. Cables hanging down from the bottom of the case are attached to the wheelchair, and the wheelchair is hauled by a winch and cable arrangement up inside of the now vertical wheelchair case. Once the wheelchair is inside, the case is again pivoted up onto the top of the car, using the power from the winch and winch motor mounted on the car top and not on the case.

Recently there have been others who have advertised similar structures for accomplishing the purpose of this invention. To date, none have caught on to the extent that they are commercially available on the market in quantity.

The patents set out above were uncovered in a search of a forerunner of the structure of this invention.

The inventor and those in privity with him are aware of no prior art which is closer than that discussed above; and are aware of no prior art which anticipates the claims made herein.

SUMMARY OF THE INVENTION

A carrier for storing a wheelchair on top of a car and for raising and lowering the chair to and from the car top includes a carrier case mounted on the car top and open to one side of the car. The case has a floor and a roof, end walls and one permanent side wall extending between the floor and the roof. The case is open to one side of the car, and this opening, in the form of the invention as shown, can be closed with a second side wall or door when a wheelchair is stored in the carrier or when the carrier is empty, and can be opened during the loading and unloading process.

A moving platform is mounted with respect to the carrier case floor to be movable between a loaded position entirely within the case and an unloading position extending partially outside the open side of the case.

The carrier includes a wheelchair cage which is adapted to temporarily encompass and retain a wheelchair. Cable means extends from the wheelchair cage to winch means mounted inside of the case. In the form of the invention shown, the winch means is mounted on a movable platform and is operable to permit the cable means to unwind to allow the wheelchair cage to move from a retracted position on a platform to an unloaded position adjacent the ground alongside of the car below the open side of the carrier case. The winch means is also operable to wind up on the cable means to move the cage from this unloaded position to its retracted position.

The moving platform has a downwardly hinged outer edge portion adjacent the open side of the case, this hinged portion being so constructed and restricted as to fold downwardly as the platform moves from its loaded to its unloading position, the downward movement of the hinged portion being limited to no more than an acute angle to the horizontal. In this manner, the outer edge of the platform provides a guide to the cable means and a slide for the wheelchair cage which overhangs the side of the car thus allowing the cage to be moved between its unloaded and retracted position with ease and without contacting the side of the car. In the form of the invention as shown, a wheelchair cage guide roller is positioned at the outer edge of the hinged portion to facilitate further the movement of the wheelchair cage and cable means whether the wheelchair cage is carrying a wheelchair or not.

BRIEF DESCRIPTION OF THE DRAWINGS

FIG. 6 is a perspective view of a wheelchair cage useful as part of the car top wheelchair carrier;

FIG. 7 is a reduced fragmentary side elevational view of the wheelchair cage of FIG. 6 and showing in phantom a wheelchair encompassed and retained by said cage; and FIG. 8 is a fragmentary side elevational view of the wheelchair cage of FIGS. 6 and 7 but showing in condition to be lowered over a wheelchair to encompass it or to be raised to position in clearing relationship to an encompassed wheelchair.

DESCRIPTION OF PREFERRED EMBODIMENT

Figure 1:
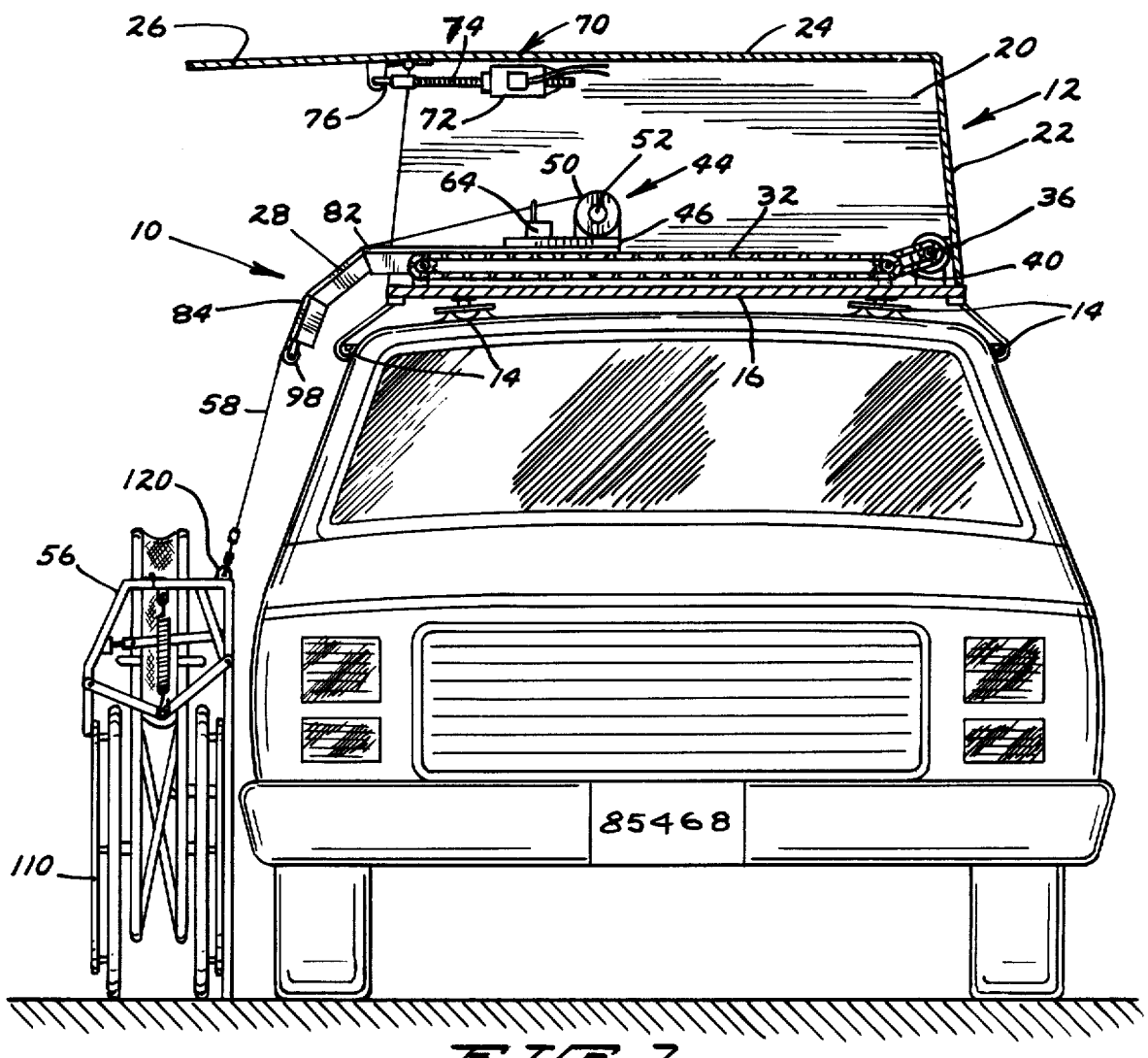
FIG. 1 is a end elevational view with the near end wall broken away of a wheelchair cage and wheelchair in unloaded position and a car top wheelchair carrier installed on a car which is shown in front elevation.

A car top wheelchair carrier 10 includes a carrier case 12 mounted on the top of a car 13 in any usual or preferred manner as at 14. The carrier case, as shown, includes a floor 16, a front end wall 18, a rear end wall 20, a first fixed side wall 22, a roof 24, and a second side wall or door 26 pivotably mounted with respect to the roof to be movable between a closed position in contacting relationship to the floor and the front and rear end walls and an open position in substantially aligned parallel relationship to the roof.

A moving platform 28 is bolted as at 30 to chain flights of a pair of endless conveyor chains 32,32. These chains are driven by a reversible electric chain drive motor 34 through the instrumentality of a chain drive motor drive shaft 36, a conveyor chain drive shaft 38, a conveyor pinion and drive chain assembly 40 linking motor drive shaft 36 and conveyor chain drive shaft 38, and conveyor drive chain pinions 42,42 mounted on opposite ends of the conveyor chain drive shaft 38 and driving the conveyor chains 32,32.

A winch means 44 is mounted on extensions 46,46 of the moving platform 28 and includes a pair of winches 48,48 driven by a reversible back-geared electric winch motor 50 through the instrumentality of a winch motor drive shaft 52.

A wheelchair cage 56 is connected to the winches 48,48 by cable means 58,58 through the instrumentality of cable loops 60,60 forming the ends of cable means 58,58, and a pintle 62. A winch means limit switch 64 is situated on one of the moving platform extensions 46. A platform movement limit switch 66 is mounted to the first side wall 22 of the carrier case 12.

A door operator assembly 70 includes a door operator motor assembly 72 of any usual or preferred construction having a reversible motor and worm gear drive together with internal limit switches. The door operator assembly also includes a worm gear 74 rotatably and pivotably mounted with respect to the second movable side wall or door 26 of the case 12 as at 76.

Figure 4:
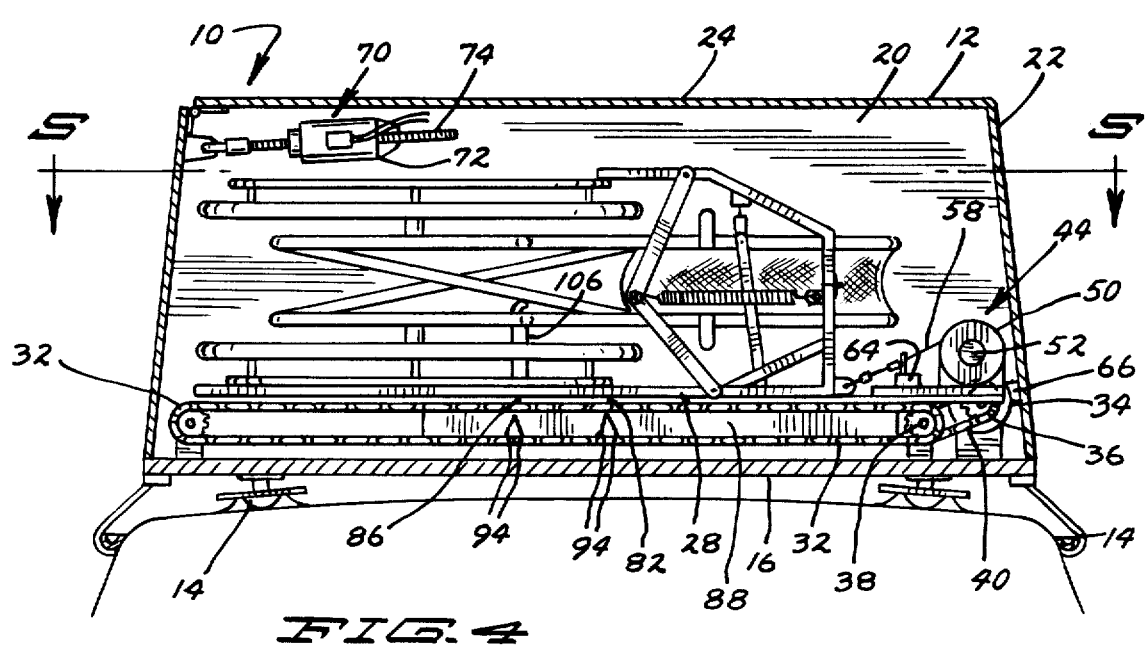
FIG. 4 is an enlarged end elevational view of the wheelchair carrier of FIGS. 1 through 3 but showing the moving platform in its loaded position and the wheelchair cage and wheelchair in the cage-retracted position.
Figure 2:
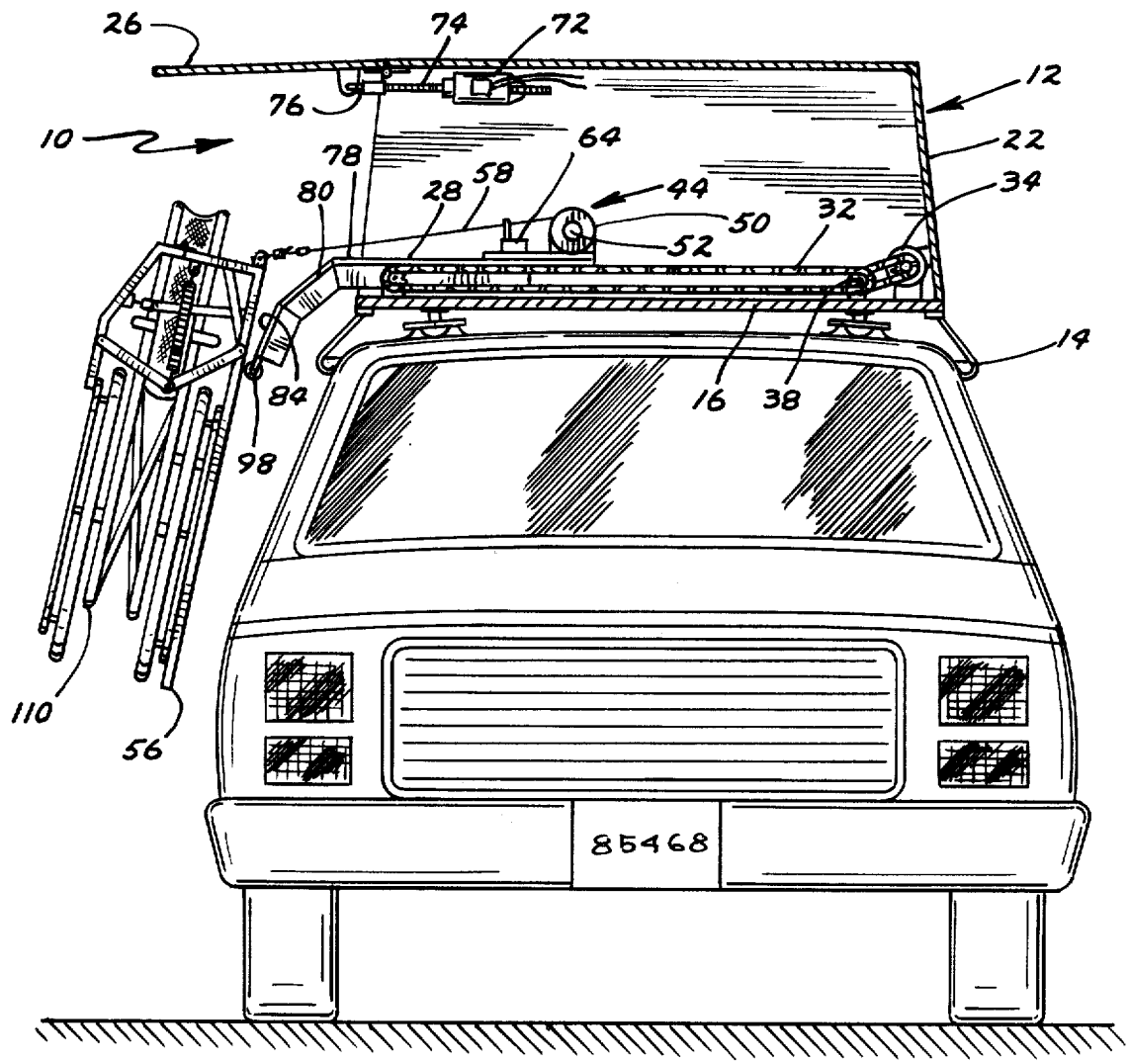
FIG. 2 is an end elevational view of the car top carrier as seen in FIG. 1 but with the wheelchair cage and wheelchair shown in an intermediate position.
Figure 3:
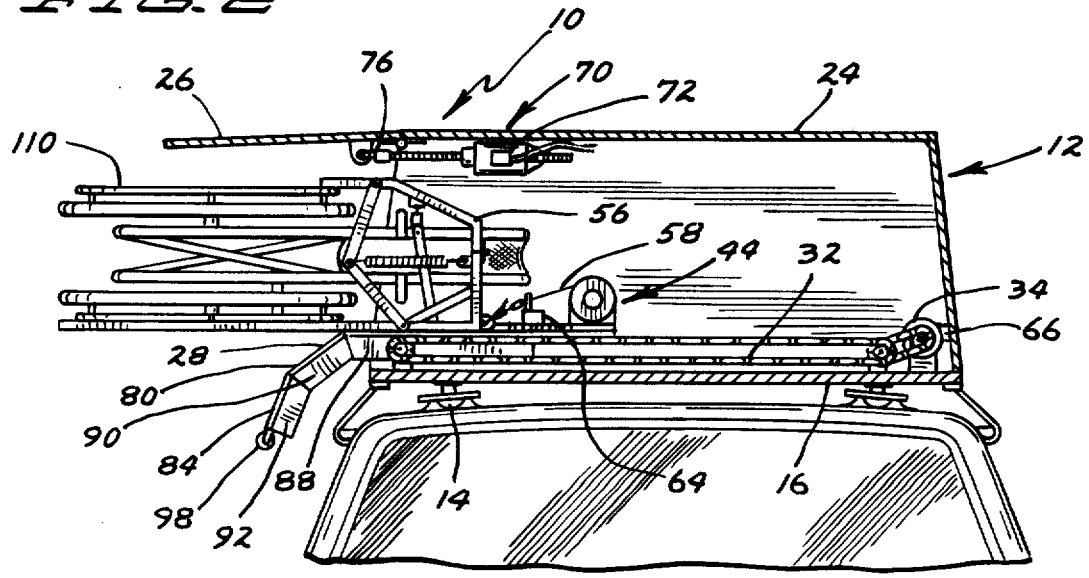
FIG. 3 is a view of the wheelchair carrier as seen in FIGS. 1 and 2 but with the wheelchair cage and wheelchair in the cage-retracted position with respect to a moving platform and with the platform in its unloading position.

Moving platform 28 includes a horizontally stable first panel 78 bolted to the conveyor chains as at 30, a second panel 80 hinged to the first panel as at 82, and a third panel 84 hinged to the second panel as at 86. Each of the three panels is undergirded by a pair of parallel, spaced-apart angle iron segments, each one of the segments having a horizontal leg affixed to the underside of its panel and a vertical leg in vertical alignment with the vertical legs of the two associated segments attached to the other panels. Angle iron segments 88,88 are affixed underneath the horizontally stable first panel 78 of the platform 28 and have horizontal legs which ride continually on the upper surfaces of the endless conveyor chains 32. As perhaps best seen in FIG. 4, angle iron segments 90,90 (only one is seen in FIG. 4) are fastened to the underside of second panel 80, while angle iron segments 92,92 are fastened under third panel 84 of the platform 28. With the platform 28 in its loaded position entirely within the case 12, the horizontal legs of these angle iron segments 90 and 88 will ride on the top of the endless conveyor chains 32. As the platform moves from its loaded position toward its unloading position, the second panel 80 and the third panel 84 will lose their horizontal support as they move off of the conveyor chains. To permit downward movement of these panels as they lose their horizontal support, and to limit the extent of that downward movement, the vertical legs of each of the angle iron segments which are adjacent to and in alignment with the vertical legs of other segments are provided with beveled surfaces 94. Then as the second and third panels of the moving platform 28 lose their horizontal support from the conveyor chains, they will hinge downwardly until adjacent beveled surfaces 94 come into contact with each other and prevent further downward movement. This is the positioning of the parts as seen in FIGS. 1, 2 and 3.

A wheelchair cage guide roller 98 is rotatably mounted at the outermost end of third panel 84.

Now with particular attention to FIGS. 6 through 8, the wheelchair cage 56 includes a rectangular angle iron back frame member 100, and an integral, braced, top frame member 102 extending forwardly in normal relation to the top edge of back frame member. Pivotably mounted to a forward edge of the top frame member is a front hood member 104. Extending outwardly from an intermediate portion of the wheelchair cage back frame member 100 are a pair of wheelchair seat support bar frame engaging arms 106,106; and extending inwardly from a central lower end portion of the front hood member 104 is a wheelchair manual propulsion ring engaging arm 108. Selected areas of back frame member 100 and top frame member 102 are covered with hardware cloth 126 or the like.

In order to encompass a wheelchair such as a wheelchair 110 when it is in its folded condition, the wheelchair cage while in a releasing condition seen in FIG. 8 will first be lowered down over the wheelchair in a manner to be described. To move the wheelchair cage to the encompassing and retaining condition as seen in FIG. 7, the front hood member 104 will be moved from position as seen in FIG. 8 to position as seen in FIG. 7, thus positioning the wheelchair manual propulsion ring engaging arm 108 under the top edge of that propulsion ring and positioning the two wheelchair seat support bar frame engaging arms 106,106 underneath the seat support bar on the wheelchair. This positioning of the parts is illustrated in FIGS. 1 through 5, but can perhaps be most readily understood by reference to FIG. 7 where the wheelchair 110 is shown in phantom.

In order to move the front hood member 104 of a wheelchair cage 56 between the position seen in FIG. 7 and the position seen in FIG. 8, a locking linkage assembly 112 is employed. This locking linkage assembly includes a locking bar 114 pivotally mounted to a central portion of the front hood 104 as at 116; and a pair of locking linkage shortening links 118,118, each pivotably attached to the other, one pivotably attached to the locking bar 114, and the other pivotably attached to an appropriate location in an upper central portion of a back frame member.

With or without the wheelchair 110 being encompassed by the wheelchair cage 56, the locking bar 114, as seen in FIG. 8, can be moved downwardly to assume the position as seen in FIG. 7. This will cause the shortening links 118,118 to coact with this locking bar, the front hood member 104, and the back frame member 100 to move the various elements to the position as seen in FIG. 7. It is when the cage is in the position as seen in FIG. 7 that it is ready to be moved up into the carrier case 12. In order to accomplish this, four wheelchair lifting ears 120 are provided extending upwardly from the top horizontal structural member of the rectangular back frame member 100. All of these ears are provided with mutually aligned holes to receive the pintle 62. The pintle extends at the same time through cable loops 60, thus to firmly attach cable means 58,58 to the cage so that the cage can be lifted.

In order to bias the cage to continually tend to move form position as seen in FIG. 7 to position as seen in FIG. 8, a pair of tension springs 122,122 (one is shown) and two pair of two biasing links 124 are attached between the back frame member 100, top frame member 102, and front hood member 104, as clearly seen in FIGS. 6, 7 and 8.

OPERATION

With the wheelchair cage 56 in its retracted position, with the moving platform in its loaded position and with the door 26 in its closed position, a wheelchair user will approach the side of the car 13 adjacent the door 26 of the car top wheelchair carrier 10 mounted thereon. He or she will open the car door situated directly under the carrier and will transfer himself or herself to the car seat. Using any usual or preferred circuit control means (not shown) electromotive force form the car's electrical system will initially be supplied to the door operator assembly 70 in direction to cause the door operator motor assembly 72 to drive the door operator worm gear 74 to the left as seen in FIGS. 1 through 4 to move the second movable side wall or door 26 to its open position as seen in FIGS. 1, 2 and 3. Simultaneously the electric chain drive motor 34 will be energized in direction to begin moving the movable platform from its loaded toward its unloading position.

When the parts have moved from the position as seen in FIG. 4 to the position as seen in FIG. 3, an internal limit switch (not shown) in the drive motor 38 will stop movement of the conveyor chains 32,32 and, therefore, of the moving platform 28. Reverse or unwinding motion of the winch means 44 will then be instituted, thus unwinding the cable means 58,58 to allow the wheelchair cage 56, in this case empty, to move by gravity from the position as seen in FIG. 3 to the position as seen in FIG. 2.

For clarity of illustration, the car door has been omitted from the drawings, but this car door will be open at this stage; and when the empty wheelchair cage 56 gets down within reach of the wheelchair user seated in the car, he will manually lift the locking bar 114 to move the wheelchair cage from the condition as seen in FIG. 7 to the condition as seen in FIG. 8. He will then move the wheelchair to position directly under the wheelchair cage, and will again initiate action of the winch means 44 to lower the wheelchair cage over the wheelchair. When this has been accomplished, he will line up the folded wheelchair and the rectangular angle iron back frame member 100 in such a manner that a major structural member of the folded wheelchair, the wheelchair seat support bar as shown, will be in overlying relation to the wheelchair frame engaging arms 106,106. He will then move the locking bar back down to its locked position from the position as seen in FIG. 8 to the position as seen in FIG. 7, causing the wheelchair engaging arm 108 on the front hood member 104 to engage a major structural member of the folded wheelchair, in the form of the invention as shown, a wheelchair manual propulsion ring.

Figure 5:
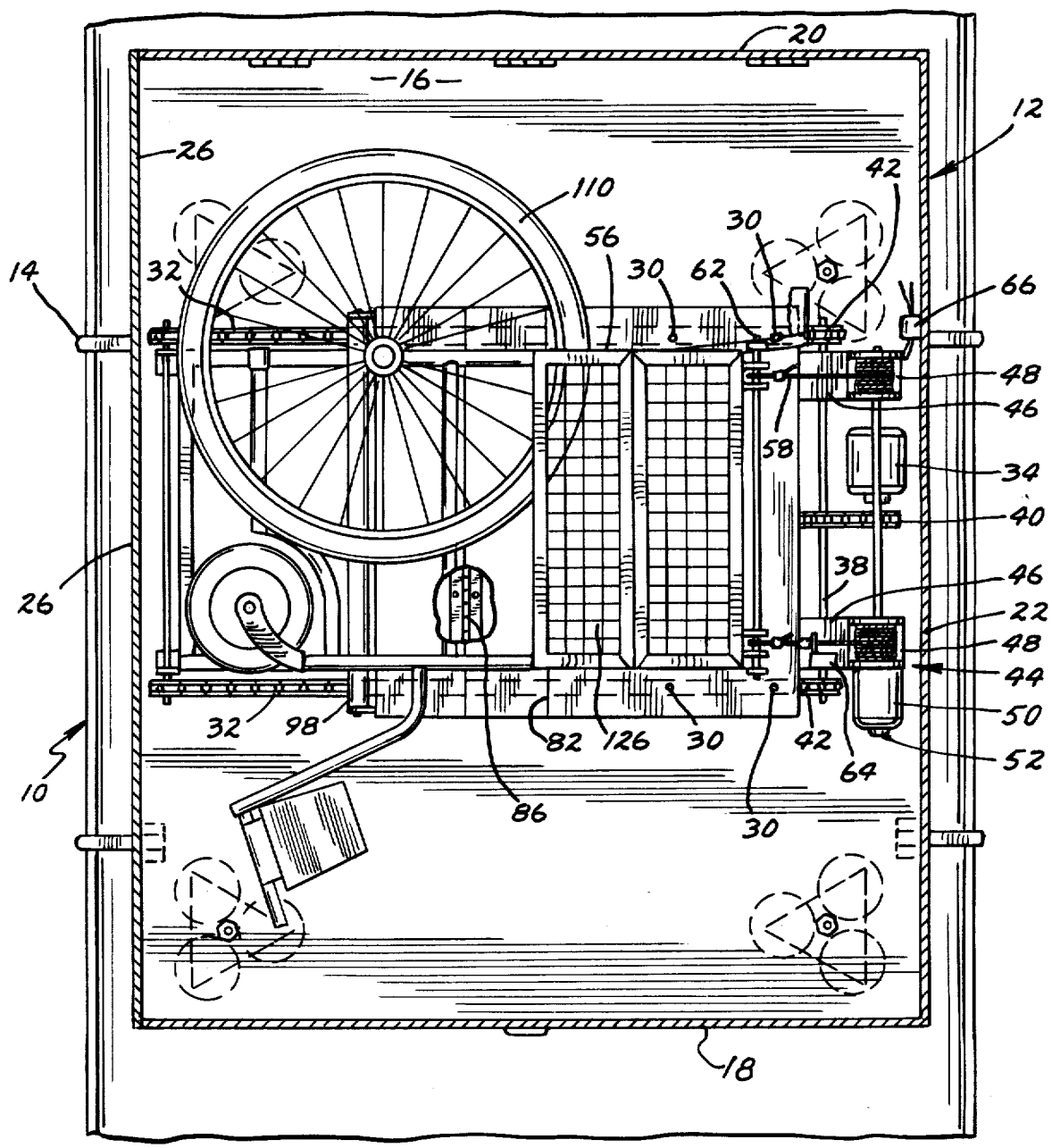
FIG. 5 is an enlarged horizontal sectional view taken on the line 5—5 in FIG. 4.

The operator will then reverse the procedure, reversing the activation of the winch means 44 to cause the cable means 58 to draw the wheelchair cage 56, now encompassing and retaining the wheelchair 110, progressively up from position as seen in FIG. 1, past the position as seen in FIG. 2 to the position as seen in FIG. 3. When an appropriate protrusion on cable means 58 comes in contact with the operating switch arm of winch means limit switch 64, the winch means can be electrically deactivated, and the reversable electric chain drive motor 34 activated in direction to move the conveyor chains 32,32 and consequently the moving platform 28 from its unloading position as seen in FIG. 3 to its loaded position as seen in FIGS. 4 and 5. When this position is reached, one of 30 the platform extensions 46 will activate the switch handle of platform movement limit switch 66. At this point, the chain drive motor 34 will be deactivated and the door operator motor assembly 72 will be activated in direction to move the door 26 from its opened to its closed position.

With the wheelchair 110 stored or stowed as seen in FIGS. 4 and 5, the operator can now move using his car to any place that a car can be driven.

To transfer to his wheelchair, the operator will repeat the procedure used in loading his wheelchair. After opening the car door, he will cause the door 26 to be moved to its opened position, causing platform 28 to be moved to its unloading position, and wheelchair cage, now encompassing the wheelchair 110, to be moved to its unloaded position with the wheelchair on the ground as seen in FIG. 1. He will move the wheelchair cage from the encompassing and retaining condition as seen in FIG. 7 to the releasing position as seen in FIG. 8. The winch means will be activated sufficiently to bring the wheelchair cage 56 in clearing relation to the wheelchair 110, at which point the operator will move the locking bar 114 to move the wheelchair cage from its releasing position to its retaining condition. Movement of the parts will then be continued to move through the positioning as seen in FIGS. 2 and 3 to that seen in FIGS. 4 and 5, but without the wheelchair on board.

The wheelchair operator will then open up the wheelchair and move from the car seat into the wheelchair, close the car door and be on his way.

If at any point in time, it is necessary or desirable to quickly release the wheelchair from the car top carrier, this can be accomplished by first releasing the wheelchair cage 56 from the cable means 58,58. This is done by withdrawing the pintle 62 from the wheelchair lifting ears 120. The wheelchair cage can then be moved from its retaining condition to its releasing condition and manually lifted off of the folded wheelchair. For this purpose, the front end wall 18 can be hinged at the bottom, for example, so the pintle 62 can be withdrawn with the parts positioned as seen in FIGS. 4 and 5, and the wheelchair cage 56 and wheelchair 110 lifted manually (by someone without a severe physical handicap) and brought out of the carrier case 12 in direction forwardly of the car. Such a procedure can become necessary in the event of power failure of the car's electrical system, for example.

What is claimed:

1. A car top wheelchair carrier for storing a wheelchair on top of a car and for raising and lowering the chair to and from the car top, said carrier including:
   a carrier case mounted on a car top and open to one side of the car, said carrier case including a floor, a side wall extending upwardly from the floor at a side opposite the open side, and a roof;
   a moving platform movably mounted with respect to the carrier case floor to be movable between a loaded position entirely within the case and an unloading position extending partially outside of the open side of the case;

means for moving the platform between said loaded and unloading positions;

a wheelchair cage adapted to temporarily encompass and retain a wheelchair;

winch means mounted inside of the case;

cable means extending between said winch means and said wheelchair cage;

said winch means being operable when said platform is in its unloading position to permit the cable means to unwind from the winch means to allow said wheelchair cage to move from retracted position on said platform to unloaded position adjacent the ground and to wind the cable means onto the winch means to move the cage from unloaded position to retracted position; and the moving platform having a downwardly hinged outer edge portion adjacent the open side of said case, said hinged portion being so contructed and restricted as to fold downwardly to no more than an acute angle to the horizontal as said platform moves toward its unloading position and to fold up flat as it moves toward its loaded position.

2. The wheelchair carrier of claim 1 wherein:

said hinged outer edge portion of said platform includes at least one platform panel hinged to the remainder of said platform along a line normal to the direction of movement of said platform with respect to said carrier case floor, said platform being provided with means to limit the maximum angle of downward movement of said panel with respect to the horizontal;

said wheelchair cage being partially bounded by structural members on its side adjacent the carrier case when in the cage-unloaded position which define a plane surface adapted to ride over an outermost edge of said platform panel portion when said moving platform is in its unloading position in the process of moving between said cage unloaded position and said cage retracted position.

3. The wheelchair carrier of claim 2 wherein: said outermost edge of said panel portion of said platform is provided with roller means in position to contact said plane surface-defining members of said cage to assist in movement of said cage over said panel portion of said platform in movement between said cage unloded and said cage retracted position and of movement of said cage from its retracted to its unloaded position.

4. The wheelchair carrier of claim 3 wherein:

said hinged outer edge portion of said platform includes at least two platform panels each hinged along a line normal to the direction of movement of said platform with respect to said carrier case floor, said platform being provided with means to limit the maximum angle of downward movement of the outermost panel with respect to the horizontal.

5. The wheelchair carrier of claim 3 wherein:

the relationship of the hinged downwardly movable panel portion of said platform to the rest of the platform and the relationship of the wheelchair cage when in its retracted position to said platform is such that the center of gravity of said cage lies outwardly from the non-hinged panel portion of the platform to the end that the cage will be carried by gravity from its retracted toward its unloaded position as said platform moves from its loaded toward its unloaded position and as said winch means is operable to permit said cable means to unwind from said winch means.

6. The wheelchair carrier of claim 1 wherein:

said carrier case is provided with a second side wall pivotably mounted with respect to said roof in position to be movable between a closed position in contacting relationship with said floor and said roof to close said otherwise open side of said case and an open position in clearing relation to said open side of said case and in non-interfering relationship with respect to the movement of said wheelchair cage into and out of said carrier case; and means for moving said second side wall between its open and closed positions when said platform is in its loaded position and said cage is in its retracted position.

7. The wheelchair carrier of claim 2 wherein:

said wheelchair cage includes:

a rigid rectangular back frame member situated on its side adjacent the carrier case when in the cage-unloaded position and situated adjacent the carrier cage floor when in the cage-retracted position, a front hood member extending away from and pivotably connected to an upper portion of said back frame member, a locking linkage assembly operative between said front hood member and said back frame member to move said members relative to each other to move the wheelchair cage between an encompassing and retaining condition and a releasing condition, and engaging arms extending from said back frame member toward said front hood member and from said front hood member toward said back frame member in position to engage a folded wheelchair when the cage is in its encompassing and retaining condition and to be movable to position to be clear of said wheelchair when the wheelchair cage is in its releasing condition.

8. The wheelchair carrier of claim 7 wherein:

means is provided to continually bias said front hood member and said back frame member to tend to move from said retaining condition toward said releasing condition; and means is provided for connecting said cable means to said wheelchair cage at the upper edge of said back frame member.

9. The wheelchair carrier of claim 8 wherein:

said cable means includes two cables with open loops at the outer ends thereof; and said means to connect said cable means to said wheelchair cage includes two pairs of parallel spaced-apart wheelchair lifting ears extending integrally upwardly from opposite ends to said back frame member, each of said ears having a pintle receiving opening therethrough in alignment with the pintle-receiving openings of the other three ears, and a pintle passing through each of the open cable loops and all of the wheelchair lifting ears, each of the cable loops being positioned between one of said pairs of lifting ears.

10. A wheelchair cage adapted selectively to either encompass and retain a folded wheelchair or to release a formerly retained wheelchair, said wheelchair cage including:

a rigid rectangular upright back frame member;

a front hood member extending away from and pivotably connected to an upper portion of said back frame member;

a locking linkage assembly operative between said front hood member and said back frame member to move said members relative to each other to move the wheelchair cage between an encompassing and retaining condition and a releasing condition; and engaging arms extending from said back frame member toward said front hood member and from said front hood member toward said back frame member in position to engage a folded wheelchair when the cage is in its encompassing and retaining condition and to be movable to position to be clear of said wheelchair when the wheelchair cage is in its releasing condition.

11. The wheelchair cage of claim 10 wherein:

means is provided to continually bias said front hood member and said back frame member to tend to move from said retaining condition toward said releasing condition.

* * * * *